United States Patent
Giles et al.

(10) Patent No.: US 11,560,875 B2
(45) Date of Patent: Jan. 24, 2023

(54) METHOD FOR ASSEMBLING A WIND TURBINE

(71) Applicant: W3G MARINE LIMITED, Aberdeen (GB)

(72) Inventors: John Giles, Aberdeen (GB); Charles Whyte, Aberdeen (GB); Alan West, Aberdeen (GB)

(73) Assignee: W3G MARINE LIMITED, Aberdeen (GB)

( * ) Notice: Subject to any disclaimer, the term of this patent is extended or adjusted under 35 U.S.C. 154(b) by 0 days.

(21) Appl. No.: 17/295,176

(22) PCT Filed: Nov. 22, 2019

(86) PCT No.: PCT/GB2019/053311
§ 371 (c)(1),
(2) Date: May 19, 2021

(87) PCT Pub. No.: WO2020/109758
PCT Pub. Date: Jun. 4, 2020

(65) Prior Publication Data
US 2022/0010777 A1    Jan. 13, 2022

(30) Foreign Application Priority Data
Nov. 26, 2018 (GB) .................................. 1819191

(51) Int. Cl.
*F03D 13/10* (2016.01)
*B66C 1/10* (2006.01)
(Continued)

(52) U.S. Cl.
CPC ............... *F03D 13/10* (2016.05); *B66C 1/108* (2013.01); *B66C 23/185* (2013.01); *E04H 12/342* (2013.01); *F05B 2230/61* (2013.01)

(58) Field of Classification Search
CPC ............ F05B 2230/60; F05B 2230/61; E04H 12/342; E04H 12/344; B66C 1/108; B66C 23/185; F03D 13/10
See application file for complete search history.

(56) References Cited

U.S. PATENT DOCUMENTS

| 5,490,364 A | 2/1996 | Desai et al. |
| 2009/0087311 A1 | 4/2009 | Wyborn |
| 2009/0188204 A1* | 7/2009 | Stabler .................... F03D 13/10 52/745.18 |

FOREIGN PATENT DOCUMENTS

| DE | 102009008870 A1 | 9/2010 |
| EP | 2058444 A2 | 5/2009 |

(Continued)

OTHER PUBLICATIONS

"International Search Report and Written Opinion of the International Searching Authority", International Application PCT/GB2019/053311, datedFeb. 11, 2020, 13 pp.

(Continued)

*Primary Examiner* — Moshe Wilensky
(74) *Attorney, Agent, or Firm* — Myers Bigel, P.A

(57) ABSTRACT

A method of assembling a structure, such as a wind turbine, is disclosed. The method comprises a step of providing a lifting arrangement comprising a gantry disposed over and/or directly above a rail, and lifting means coupled to the gantry. The method further comprises stacking portions of the structure by: conveyably disposing a first portion of the structure relative to the rail; lifting a second portion of the structure using the lifting means; disposing the first portion underneath the second portion by conveying the first portion along the rail; and lowering the second portion onto the first portion. Also disclosed is a corresponding system for assem- (Continued)

bling a structure, such as a wind turbine, and corresponding clamping and/or gripping system.

8 Claims, 17 Drawing Sheets

(51) Int. Cl.
*B66C 23/18* (2006.01)
*E04H 12/34* (2006.01)

(56) References Cited

FOREIGN PATENT DOCUMENTS

| EP | 2952426 | A1 | 12/2015 |
|---|---|---|---|
| ES | 2389345 | A1 | 10/2012 |

OTHER PUBLICATIONS

"Patents Act 1977: Combined Search and Examination Report under Sections 17 and 18(3)", GB Application No. 3B1917064.6, dated Apr. 21, 2020, 7 pp.

\* cited by examiner

METHOD FOR ASSEMBLING A WIND TURBINE

FIELD OF INVENTION

The present invention relates to a method of assembly of a turbine(s), such as an offshore wind turbine(s). In particular, though not exclusively, the invention relates to a method of assembling, e.g. at an on-shore location or quayside, a wind turbine structure intended for offshore use, as well as associated apparatus and systems.

BACKGROUND TO INVENTION

In the field of wind turbines, in particular offshore wind turbines, there is a general trend towards installing increasingly high power-output wind turbines, for example, turbine capable of outputting 10 Mega Watts or more. However, along with increased power capabilities, the physical dimensions of such wind turbines are also increasing.

Historically, wind turbines, or at least assembled or semi-assembled components of wind turbines, may have been manufactured and/or assembled at a first location, then transported by road to a further location for deployment and/or further assembly. However, due to their increased physical dimensions, transport by road of modern turbines, or assembled portions of modern turbines, is no longer practically possible.

At present, wind turbines and their associated structures may be separately constructed onshore and transported in sections to an offshore site. There, such may be moved into position and fixed using slings and cranes.

This background serves to set a scene to allow a skilled reader to better appreciate the following description. Therefore, none of the above discussion should necessarily be taken as an acknowledgement that that discussion is part of the state of the art or is common general knowledge. One or more aspects/embodiments of the invention may or may not address one or more of the background issues.

It is an object of at least one embodiment of at least one aspect of the present invention to obviate or at least mitigate at least one problem in the prior art.

It is an object of at least one embodiment of at least one aspect of the present invention to provide a technically simple and/or commercially more cost-effective method and system for assembling a wind turbine structure than in the prior art.

Further background material includes GB 2479232 B (W3G SHIPPING LTD), which describes structures, such as wind turbine structures for offshore sites, comprising transport elements, e.g. an annular protrusion configured for complementary mating with engagement portions of a clamp which allow for transporting of the structures using that clamp. The clamp may comprise two or more portions which are positioned around the structure. A wind turbine may be transported as a completed structure. Generally, the transport element is provided at an attachment region of a tower, or the like, where the tower would attach to a support, such as a jacket. There is also described apparatus for allowing for transport of a wind turbine structure, comprising a clamp. In some cases, the apparatus is also configured so as to modify the effective centre of gravity of an associated structure, and/or the effective centre of inertia of an associated structure. An orientation assembly comprising six actuators controlled by the use of positioning signals may be provided to allow relative movement of the clamp, and thus the clamped structure, with respect to a lifting device. A crane may transport a wind turbine to/from a barge.

GB 2479232 B discloses a system, such as an offshore system, the system comprising: a wind turbine structure for a site, such as an offshore site, the structure comprising a tower for supporting a turbine and a transport element, the transport element being provided at a base of the tower and being part of a complementary mating arrangement, wherein the transport element is matable with an engagement element of a clamp; and an apparatus for allowing for transport of the structure, the apparatus comprising the clamp having the engagement element, the engagement element being another part of the complementary mating arrangement, the engagement element being matable with the transport element of the tower; and wherein when the engagement element of the clamp is mated with the transport element of the tower, the apparatus is configured to allow for lifting and lowering of the structure at the site from the base of the tower using the clamp. A system and clamp according to GB279232 B can find utility in the present invention.

SUMMARY OF INVENTION

According to a first aspect of the present invention there is provided a method of assembling a structure, such as a wind turbine, e.g. according to the appended claims.

The method may comprise one or more of the steps of:
providing a lifting arrangement comprising:
a gantry disposed over and/or directly above a rail(s); and
lifting means coupled to the gantry; and
stacking portions of the structure by:
conveyably disposing a first portion of the structure relative to the rail(s);
lifting a second portion of the structure using the lifting means;
disposing the first portion underneath the second portion by conveying the first portion along the rail(s);
lowering the second portion onto the first portion.

The method may comprise assembling and/or positioning or maneuvering a wind turbine assembly, or at least a portion of a wind turbine assembly. The wind turbine assembly may be at least a portion of a wind turbine structure for an offshore site.

The step of lifting the second portion using the lifting means may comprise hoisting and/or raising the second portion in an upwards direction to a height above an uppermost level of first portion.

The method may comprise a step of fixedly coupling the second portion to the first portion by at least one of: bolting, welding, and/or clamping.

The structure may be a wind turbine assembly. The first and/or second portion and/or further portion may be at least one of a portion of a tower or a nacelle.

The method may further comprise a step of stacking a further portion on the second portion by: lifting the further portion using the lifting means; disposing the second portion of the structure underneath the further portion by conveying the second portion along the rail; and lowering the further portion onto the second portion.

The method may comprising preceding steps of: lifting the first portion using the lifting means; configuring a gripping and/or clamping device to grip and/or clamp the first portion; and conveying the gripping and/or clamping device along the rail.

The gantry may be disposed over a pair of parallel rails. The method may comprise a preceding step of disposing the second portion between the rails.

The rail/rails may be configured to extend and/or be continued onto a floating structure. The method may further comprise the step of conveying the first and second portions, and any further portions, along the rail onto the floating structure.

The gripping and/or clamping device may be configured for supporting and/or clamping and/or gripping at least a portion of the structure in a vertical disposition and/or substantially upright configuration.

Provision and Assembly of Components

The method may comprise a step of receiving or providing components of the wind turbine assembly at a location for assembling the wind turbine assembly, such as alongside a quay or the like.

The method may comprise a step of assembling a lifting frame, such as a gantry lifting frame or the like.

The method may comprise a step of providing a lifting frame, such as a gantry lifting frame or the like.

The method may comprise a step of supporting the lifting frame, using guy ropes, lines, chains or the like.

The method may comprise a step of providing a vehicle, such as a transporter vehicle for transporting a component or at least a portion of a wind turbine assembly.

The method may comprise a step of providing a clamp and/or gripping device, such as a gripping clamp, for gripping at least a portion of a wind turbine assembly The method may comprise a step of providing at least one rail, such as a rail for supporting a carriage and/or a rail upon which a carriage may roll, slide or be otherwise conveyed.

The method may comprise a step of providing a carriage for use with the at least one rail. The clamp and/or gripping device may be provided on, about, around, or otherwise affixed to, the carriage.

The method may comprise providing one or more winches and/or pulleys. The winches and/or pulley may be provided on the lifting frame for lifting a component of the wind turbine assembly. The winches and/or pulley may be moveably disposed on the lifting frame, such as disposed on wheels and/or at least one rail.

The method may comprise a step of providing a clamping device and/or gripping device, such as a gripping clamp or gripper assembly for gripping at least a portion of the wind turbine assembly.

The method may comprise a step of providing a foundation, such as a foundation for the wind turbine assembly. The foundation may be a floating foundation. The foundation may be a submersible or semisubmersible foundation.

The method may comprise a step of providing an installation vessel, such as an installation vessel for carrying or transporting at least a portion of the wind turbine assembly.

Wind Turbine Assembly: Clamping Lower Tower Portion

The method may comprise a step of disposing a first portion of the wind turbine assembly, such as a lower tower section, on the vehicle, e.g. the transporter.

The method may comprise a step of driving or otherwise maneuvering the transporter carrying the first portion of the wind turbine assembly towards the lifting frame.

The method may comprise a step of driving or otherwise maneuvering the transporter carrying the first portion such that the first portion is disposed below, or proximate to, the lifting frame.

The method may comprise a step of driving or otherwise maneuvering the transporter carrying the first portion such that the first portion may be disposed between a pair of rails. The pair of rails may be disposed below and/or may extend below the lifting frame and/or a gantry of the lifting frame.

The method may comprise a step of attaching the first portion to the lifting frame, such as by at least one line, cable, chain, rope, or the like.

The method may comprise a step of engaging, coupling or attaching the first portion to at least one pulley or winch, by at least one line, cable, chain, rope, or the like.

The method may comprise a step of hoisting and/or raising the first portion in an upwards direction. The method may comprise hoisting the first portion to a height above an upper level of the rail/rails.

The method may comprise a step of disposing the clamp and/or gripping device in a first position, the first position being below the first portion. The method may comprise moving, sliding, rolling, or otherwise maneuvering the clamp and/or gripping device along the rail/rails to a position below the first portion. The clamp and/or gripping device may be disposed on a trolley, carriage or the like. The trolley, carriage or the like may be disposed on the rail/rails.

The method may comprise a step of configuring the clamp and/or gripping device into a non-clamping/non-gripping configuration, lowering the first portion into the clamp and/or gripping device. The method may comprise a step of lowering the first portion into the clamp and/or gripping device. The method may comprise a step of configuring the clamp and/or gripping device into a clamping/gripping configuration, such that the clamp and/or gripping device grips or clamps the first portion. The clamp and/or gripping device may be configured to engage with a flange or rim disposed on an outer surface of the first portion. The flange may be disposed at, or towards, the bottom of, or a lower section of, the first section.

The step of hoisting, raising and/or lowering the first portion may comprise operating winches and/or pulleys to adjust a height of the first portion. The pulleys and/or winches may be maneuvered on the lifting frame, in particular along a gantry of the lifting frame, to position the first portion at a desired position. For example, the pulleys and/or winches may be disposed on one or more carriages, trolleys, castors or the like. The pulleys and/or winches may be position my means of at least one further pulley and/or winch, my hydraulic, motorised or other suitable means.

Wind Turbine Assembly: Adding a Second Section

The method may comprise a step of moving the clamp and/or gripping device from the first position to a second position, the second position not being below the lifting frame or gantry of the lifting frame. The method may comprise a step of moving the clamp and/or gripping device, wherein the clamp and/or gripping device is gripping or clamping and/or gripping the first portion, to the second position. The method may comprise a step of moving the clamp and/or gripping device by moving, sliding, rolling, or otherwise maneuvering the clamp and/or gripping device along the rail/rails to the second position.

The method may comprise a step of disposing a second portion of the wind turbine assembly, such as a mid-tower section, on the vehicle, e.g. the transporter.

The method may comprise a step of driving or otherwise maneuvering the transporter carrying the second portion of the wind turbine assembly towards the lifting frame.

The method may comprise a step of driving or otherwise maneuvering the transporter carrying the second portion such that second portion is disposed below, or proximate to, the lifting frame.

The method may comprise a step of driving or otherwise maneuvering the transporter carrying the second portion such that the second portion is disposed between the pair of rails.

The method may comprise a step of attaching the second portion to the lifting frame, such as by at least one line, cable, chain, rope, or the like. The method may comprise a step of engaging, coupling or attaching the second portion to at least one pulley or winch, by at least one line, cable, chain, rope, or the like.

The method may comprise a step of hoisting and/or raising the second portion in an upwards direction. The method may comprise hoisting the second portion to a height above an uppermost level of first portion.

The method may comprise a step of disposing the clamp and/or gripping device, e.g. the clamp and/or gripping device clamping or gripping the first portion, in the first position, wherein the first position is below the second portion. The method may comprise moving, sliding, rolling, or otherwise maneuvering the clamp and/or gripping device along the rail/rails to a position below the second portion.

The method may comprise a step of lowering the second portion onto the first portion.

The method may comprise a step of affixing or attaching the second portion to the first portion, such as by at least one of bolting, welding, clamping, or the like.

Wind Turbine Assembly: Adding a Third or Further Sections

The method may comprise steps of repeating at least some of the preceding steps to add a third, fourth or further portion to the wind turbine assembly. The wind turbine may comprise a tower, wherein the tower comprises a plurality of tower sections. In a preferred embodiment, the tower may comprise three tower sections.

Wind Turbine Assembly: Adding a Nacelle

The method may comprise a step of affixing or attaching an upper portion of the wind turbine assembly to the wind turbine assembly. The upper portion may be a turbine. The upper portion may be a nacelle. The nacelle may comprise, or contain, a turbine.

The method may comprise a step of moving the clamp and/or gripping device from the first position to the second position or further position, the second position or further position not being below the lifting frame or gantry of the lifting frame. The method may comprise a step of moving the clamp and/or gripping device, wherein the clamp and/or gripping device clamps or grips a tower section of the wind turbine. The tower section of the wind turbine may comprise a plurality of tower portions. The plurality of tower portions may have been stacked and/or assembled according to the preceding method steps.

The method may comprise a step of moving the clamp and/or gripping device by moving, sliding, rolling, or otherwise maneuvering the clamp and/or gripping device along the rail/rails to the second position or further position.

The method may comprise a step of disposing the upper portion of the wind turbine assembly, such as the nacelle, on the vehicle, e.g. the transporter.

The method may comprise a step of driving or otherwise maneuvering the transporter carrying the upper portion of the wind turbine assembly towards the lifting frame.

The method may comprise a step of driving or otherwise maneuvering the transporter carrying the upper portion such that upper portion is disposed below, or proximate to, the lifting frame.

The method may comprise a step of driving or otherwise maneuvering the transporter carrying the upper portion such that the upper portion is disposed between the pair of rails.

The method may comprise a step of attaching the upper portion to the lifting frame, such as by at least one line, cable, chain, rope, or the like. The method may comprise the step of engaging, coupling or attaching the upper portion to at least one pulley or winch, by at least one line, cable, chain, rope, or the like.

The method may comprise a step of hoisting and/or raising the upper portion in an upwards direction. The method may comprise hoisting the upper portion to a height above an uppermost level of the tower portion or tower section of the wind turbine.

The method may comprise a step of disposing the clamp and/or gripping device, e.g. the clamp gripping or clamping the first portion, in the first position, wherein the first position is below the upper portion. The method may comprise moving, sliding, rolling, or otherwise maneuvering the clamp and/or gripping device along the rail/rails to a position below the upper portion.

The method may comprise a step of lowering the upper portion onto the tower section or tower portion.

The method may comprise a step of affixing or attaching the upper portion to the tower section or tower portion, such as by at least one of bolting, welding, clamping, or the like.

Wind Turbine Assembly: Adding Blades

The method may comprise steps of repeating at least some of the preceding steps to add one or more blade, such as turbine blades, to the wind turbine assembly.

The one or more turbine blades may be affixed to the nacelle, or a protrusion from the nacelle, such as a shaft or rotor of a turbine contained within the nacelle.

Advantageously, the above described method may be implemented using rental rails, sliding carriages, transporter vehicles, and a tall gantry lifting frame. These parts are available on the rental market at less than half the cost of an equivalent rotating crane.

Positioning Assembled Wind Turbine

The method may comprise a step of positioning or maneuvering a wind turbine assembly.

The method may comprise a step of positioning or maneuvering the wind turbine assembly onto a vessel.

The method may comprise a step of positioning or maneuvering the wind turbine assembly onto a foundation, such as a structural foundation for a wind turbine. The foundation may be a floating foundation. The foundation may be a submersible or semisubmersible foundation.

The method may comprise a step of positioning or maneuvering the wind turbine assembly onto a support, such as a transition piece, jacket, tripod, gravity base, monopile, or the like. Such a support may be considered to be a substructure.

The method of positioning or maneuvering the wind turbine assembly may comprise moving, driving, or otherwise propelling or powering the clamp and/or gripping device along the at least one rail. The method of positioning or maneuvering the wind turbine assembly may comprise moving, driving, or otherwise propelling or powering the carriage along the at least one rail, wherein the carriage supports or comprises the clamp and/or gripping device.

System for Assembling a Wind Turbine

According to a second aspect of the invention there is provided a system for assembling a structure, such as a wind turbine, the system comprising: a gantry disposed over and/or directly above a rail; lifting means coupled to the gantry; and means for conveying a portion of the structure along the rail.

The means for conveying a portion of the structure may comprise a gripping and/or clamping device configurable between a gripping and/or clamping configuration for gripping and/or clamping a portion of the structure and a non-gripping and/or non-clamping configuration.

The gripping and/or clamping device may be coupled to and/or mounted on a carriage or trolley. The carriage or trolley may be adapted to be conveyed along the rail.

The system may comprise the rail.

The lifting means may comprise a winch and/or a pulley.

The system may be for assembling a wind turbine assembly.

The system may be a system for assembling and/or positioning or maneuvering a wind turbine assembly or at least a portion of a wind turbine assembly. The wind turbine assembly may be a wind turbine structure for an offshore site.

The system may comprise a clamp and/or gripping device. The clamp and/or gripping device may comprise a gripping clamp or gripper assembly for gripping at least a portion of a wind turbine assembly.

The clamp and/or gripping device may comprise a collar. The clamp and/or gripping device may comprise at least a portion of a collar. The collar may be for positioning about or around a tower or portion of a tower of a wind turbine assembly.

The clamp and/or gripping device may have an engagement element configured for complementary mating with a wind turbine assembly, or at least a portion of a wind turbine assembly.

The clamp and/or gripping device may comprise two or more clamp and/or gripping device portions. Some or all of the clamp and/or gripping device portions may comprise the engagement element. The two or more clamp and/or gripping device portions may be configured as a split clamp. The clamp and/or gripping device portions may be separable to allow for insertion and clamping/gripping of a structure. The clamp and/or gripping device may be configured to surround, or mostly surround an associated structure. The clamp and/or gripping device (e.g. clamp portions) may be opened and/or closed using one or more pistons. Each clamp and/or gripping device portion may be associated with one or more pistons. The clamp and/or gripping device portions may be configured to open/close radially. The clamp and/or gripping device may comprise three clamp and/or gripping device portions.

The engagement element may be configured to extend around some or all of the clamp and/or gripping device. The engagement element may be annular. The engagement element may comprise a recess, or groove. The engagement element may be configured with a plurality of protrusions and/or recesses.

The clamp and/or gripping device and/or engagement element may comprise one or more tapered portions. The tapered portion(s) may be radially tapered. The clamp and/or gripping device and/or engagement element may be configured to provide for interference mating with a portion of a wind turbine assembly. The clamp and/or gripping device and/or engagement element may be configured such that the one or more tapered portions provide for mating with one or more complementary tapered portions of the wind turbine assembly. The mating may be an interference mating. First and second tapered portions may be provided so as to face away from one another. First and second complementary tapered portions may face one another.

The system may comprise at least one rail. The rail may be a rail for supporting a carriage and/or a rail upon which a carriage may roll, slide or be otherwise conveyed.

The system may comprise a pair of rails. The rails of the pair of rails may be substantially parallel to one another. The rails may form a track.

The system may comprise a carriage. The carriage may be for use with the at least one rail. The clamp and/or gripping device may be provided on, about, around, or otherwise affixed to, the carriage.

The clamp and/or gripping device may be disposed on the carriage. The clamp and/or gripping device may be fixedly attached to the carriage.

The carriage may comprise a void. The carriage may have an opening. The carriage may be suitable for carrying or conveying at least a portion of a wind turbine assembly. The carriage may be formed from at least two distinct portions. In use, each portion may be disposed on a respective rail.

The carriage may comprise wheels. The carriage may comprise tracks. The wheels and/or tracks may be adapted to move, e.g. roll, along the at least one rail.

The carriage may comprise at least one support. The at least one support may slide along a surface of the at least one rail. The at least one support may be adapted to mate with, couple to, or otherwise engage with a surface of the at least one rail.

The carriage may be adapted to be pulled and/or pushed along the at least one rail. The carriage may be pulled by at least one line, chain, rope or the like. The at least one line, chain, rope or the like may be coupled to pulled in/paid out by a winch and or a pulley.

The system may comprise a lifting frame, such as a gantry lifting frame or the like. The lifting frame may comprise at least a pair of supports. The lifting frame may comprise two pairs of supports. The supports may support a gantry. The gantry may connect and/or bridge the supports.

The system may comprise means for supporting the lifting frame. The means for supporting the lifting frame may comprise guy ropes, lines, chains or the like. The lifting frame may be supported using guy ropes, lines, chains or the like.

The system may comprise a vehicle. The vehicle may be a transporter vehicle, such as a transporter vehicle for transporting a component or at least a portion of a wind turbine assembly.

The system may comprise one or more winches and/or pulleys. The one or more winches and/or pulleys may be provided on the lifting frame for lifting a component of the wind turbine assembly. The winches and/or pulley may be moveably disposed on the lifting frame, such as disposed on wheels and/or at least one rail.

The system may comprise a foundation. The foundation may be a foundation for the wind turbine assembly. The foundation may be a floating foundation. The foundation may be a submersible or semisubmersible foundation. The system may comprise a support, such as a transition piece, jacket, tripod, gravity base, monopile, or the like. Such a support may be considered to be a substructure.

The system may comprise an installation vessel. The installation vessel may be an installation vessel for carrying or transporting at least a portion of the wind turbine assembly.

The installation vessel may comprise at least one further rail. In use, the at least one rail may be aligned with the at least one further rail such that the carriage may be slid, rolled, moved, conveyed or otherwise maneuvered from the at least one rail to the at least one further rail.

Clamp and/or Gripping Device Mounted on a Carriage

According to a third aspect of the invention there is provided a clamping and/or gripping system comprising:

a clamping and/or gripping device for supporting and/or clamping and/or gripping at least a portion of a wind turbine assembly; and a carriage, wherein the clamping and/or gripping device is mounted on the carriage and the carriage is adapted to be conveyed, slid or otherwise moved along at least one rail.

The clamping and/or gripping device may be configured for supporting and/or clamping and/or gripping at least a portion of a wind turbine assembly in a vertical disposition and/or substantially upright configuration.

The clamping and/or gripping device may be configured to engage with a flange or rim disposed on an outer surface of the portion of the structure The system may comprise the at least one rail.

The system may comprise a lifting frame.

The clamp and/or gripping device may be a clamp and/or gripping device according to the second aspect. Similarly, the lifting frame may be a lifting frame according to the second aspect.

The above summary is intended to be merely exemplary and non-limiting. The invention includes one or more corresponding aspects, embodiments or features in isolation or in various combinations whether or not specifically stated (including claimed) in that combination or in isolation. It should be understood that the features defined above in accordance with any aspect of the present invention or below relating to any specific embodiment of the invention may be utilised, either alone or in combination with any other defined feature, in any other aspect or embodiment or to form a further aspect or embodiment of the invention.

BRIEF DESCRIPTION OF DRAWINGS

These and other aspects of the present invention will now be described, by way of example only, and with reference to the accompanying drawings, which are.

DETAILED DESCRIPTION OF DRAWINGS

Figure 1:
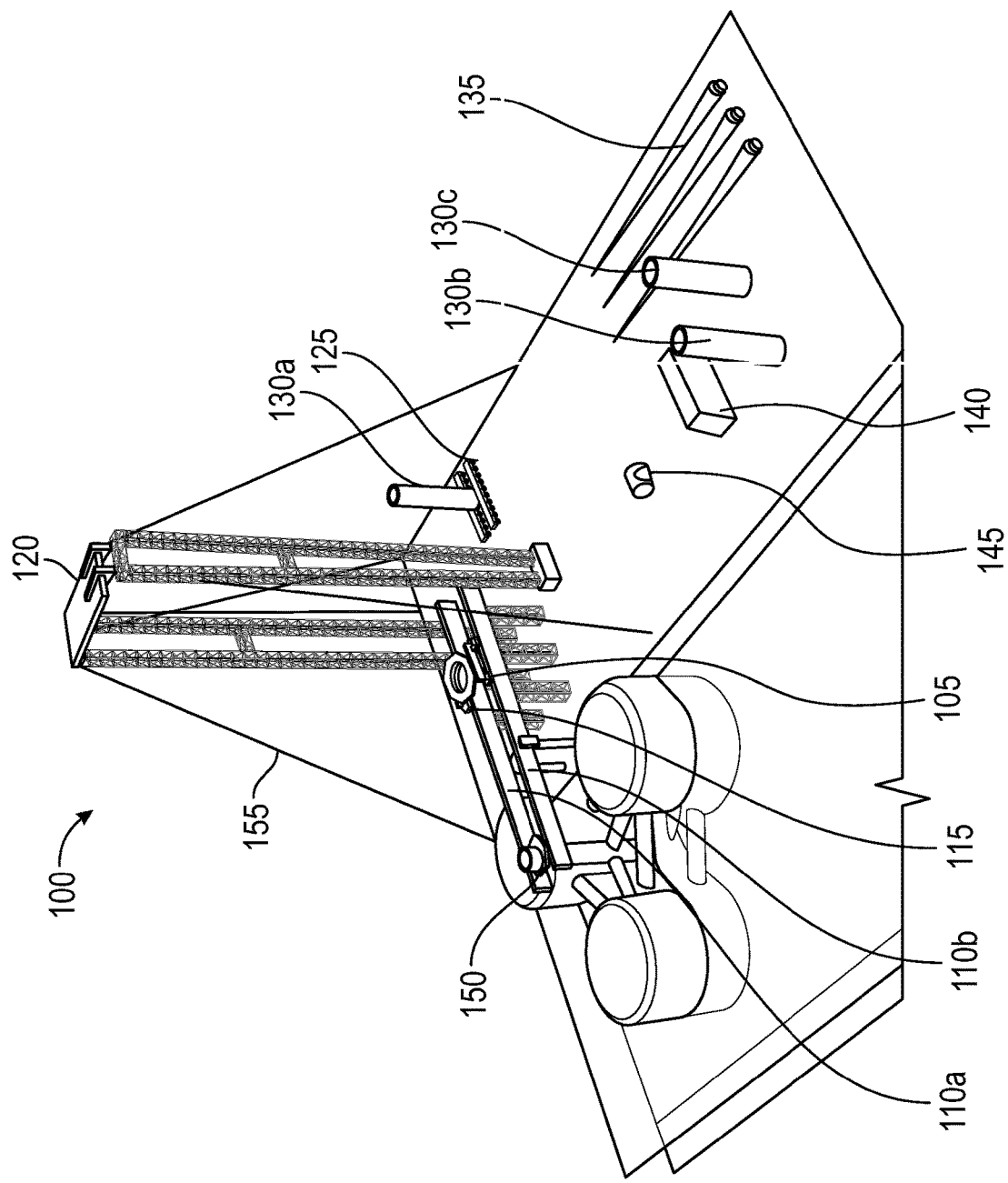
FIG. 1 exemplary components of a system for a system for assembling and/or positioning or maneuvering a wind turbine assembly or at least a portion of a wind turbine assembly, according to an embodiment of the present invention.

Referring to FIG. 1 there is shown an example of a system 100 for a system for assembling and/or positioning or maneuvering a wind turbine assembly or at least a portion of a wind turbine assembly, according to an embodiment of the present invention.

The system 100 comprises a clamp 105. The clamp 105 is a gripping clamp for gripping at least a portion of a wind turbine assembly. It will be appreciated that all references to a clamp herein may generally refer to a clamping device and/or a gripping device.

The clamp 105 is for positioning about or around a tower or portion of a tower of a wind turbine assembly, as will be described in more detail with reference to FIG. 8.

The exemplary system 100 of FIG. 1 comprises a pair of rails 110a, 110b. The rails are for supporting a carriage 115. In use, the carriage 115 can be conveyed along the rails 110a, 110b.

The rails 110a, 110b are substantially parallel to one another. The rails 110a, 110b form a track.

The system 100 may comprise the carriage 115. The carriage 115 is for use with the rails 110a, 110b. The clamp 105 is provided on the carriage 115, i.e., the clamp 105 is disposed on the carriage 115. The clamp 105 is fixedly attached to the carriage 115.

The system 100 comprises a lifting frame 120, as will be described in more detail with reference to FIGS. 2 and 3. The lifting frame 120 is supported by guy lines 155.

The system 100 comprises a vehicle 125. The vehicle 125 is a transporter vehicle for transporting a portion 130a, 130b, 130c, 135, 140, 145 of a wind turbine assembly.

The system 100 may comprise a foundation 150. In the exemplary embodiment shown, the foundation 150 is a foundation 150 for the wind turbine assembly. The foundation 150 is a floating foundation.

The rails 110a, 110b are arranged to extend from the lifting frame 120 to the foundation 150. In use, the lifting crane 150 is, for example, located at a quayside and the foundation is located in the sea.

Figure 2:
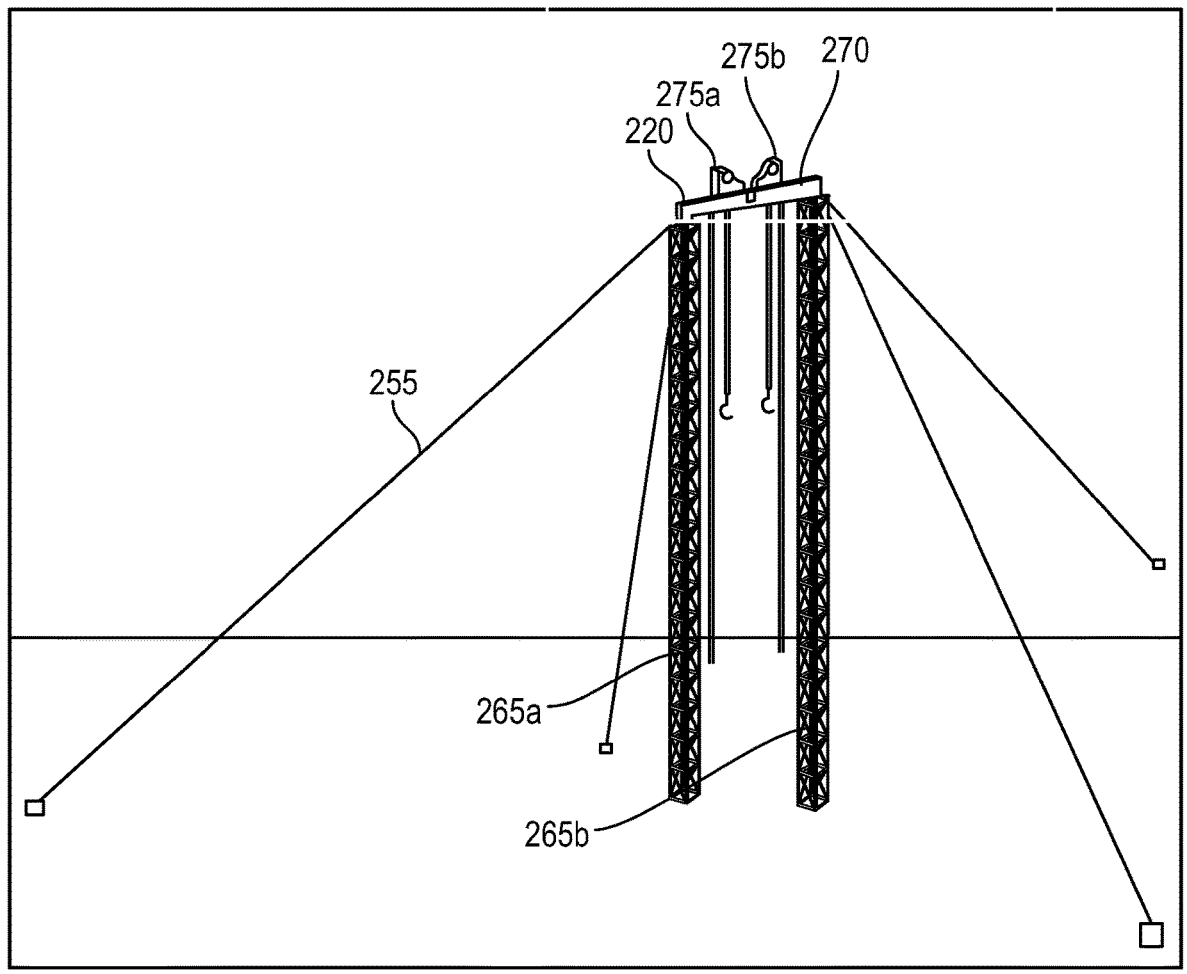
FIG. 2 an example of a lifting frame, according to an embodiment of the present invention.

FIG. 2 shows a further example of a gantry or lifting frame 220, according to an embodiment of the present invention. Similar to the lifting frame 120 of system 100 of FIG. 1, the lifting frame 220 is a gantry lifting frame. The lifting frame 220 comprises supports 265a, 265b. The supports 265a, 265b support a gantry 270. The gantry 270 bridges the supports 265a, 265b.

Means for supporting the lifting frame comprises guy lines 255.

The lifting frame 255 comprises winches 275a, 275b. In other embodiments falling within the scope of the present invention, the lifting frame 220 may alternatively or additionally comprise pulleys.

Figure 3:
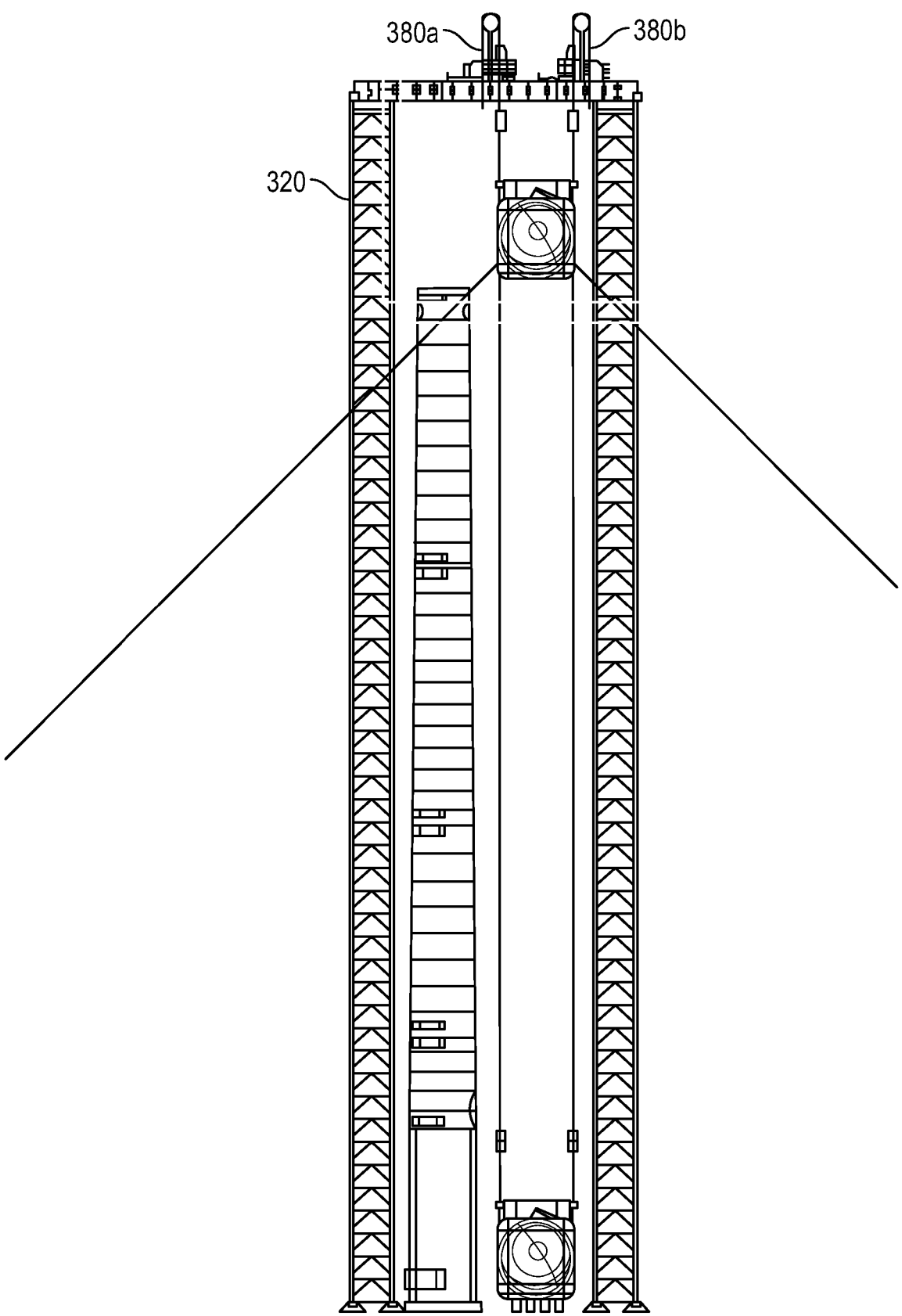
FIG. 3 a further example of a lifting frame, according to an embodiment of the present invention.

FIG. 3 shows yet a further example of a lifting frame 320. As illustrated in FIG. 3, winches 375a, 375b can move a load to be lifted or guided by the winches between, for example, a first position 380a and a second position 380b, or any further position therebetween.

One will appreciate that in yet further embodiments of a lifting frame, some or all of the winches disposed on a gantry of the lifting frame may be moveable about or along the gantry of the lifting frame of, for example, a rail or the like.

FIGS. 4 to 15 will now be used to explain a method of assembling a wind turbine assembly, according to an embodiment of the present invention.

Figure 4:
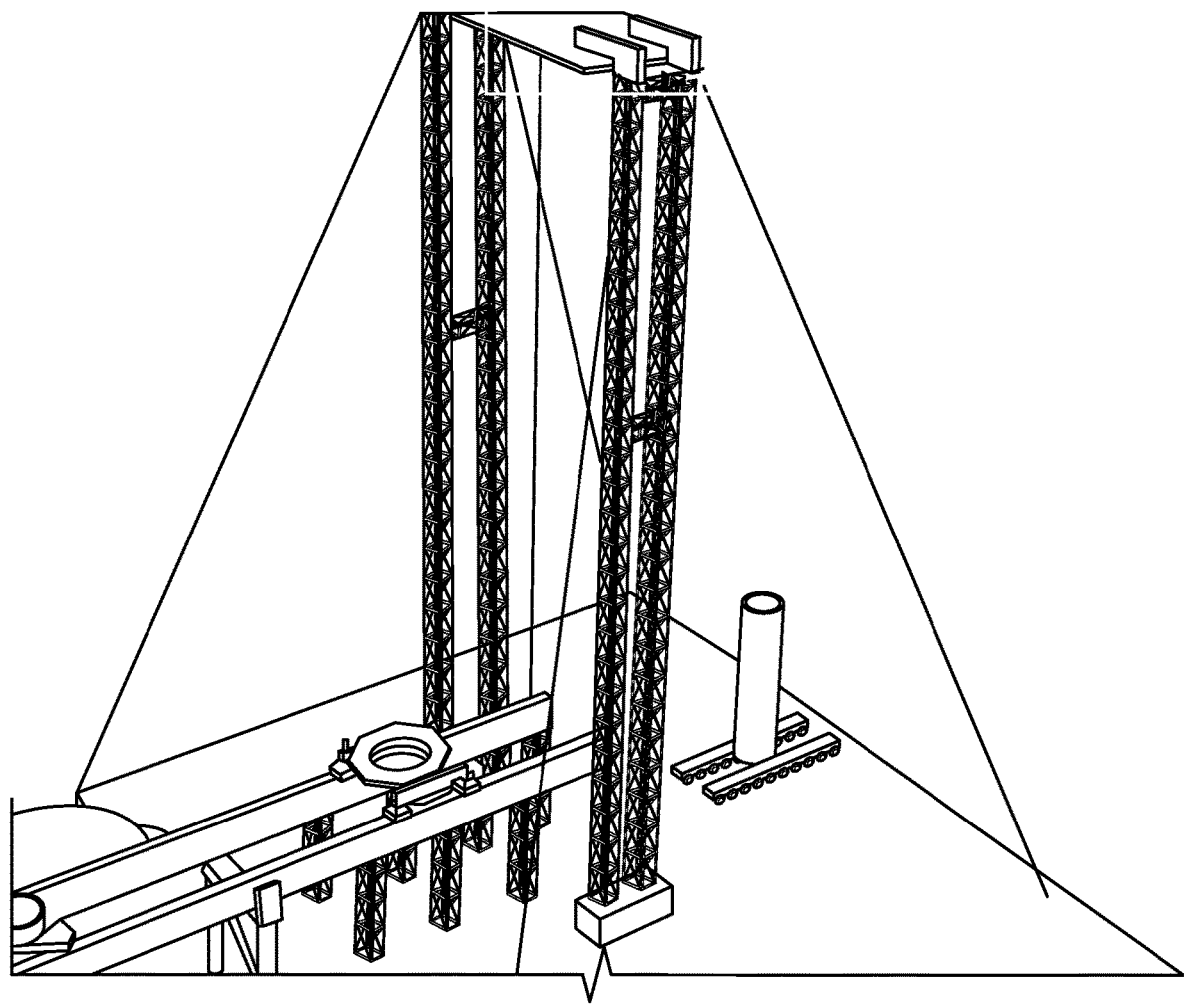
FIGS. 4-15 a sequence of perspectives views of the system in use for assembling a wind turbine assembly, according to an embodiment of the present invention.
Figure 5:
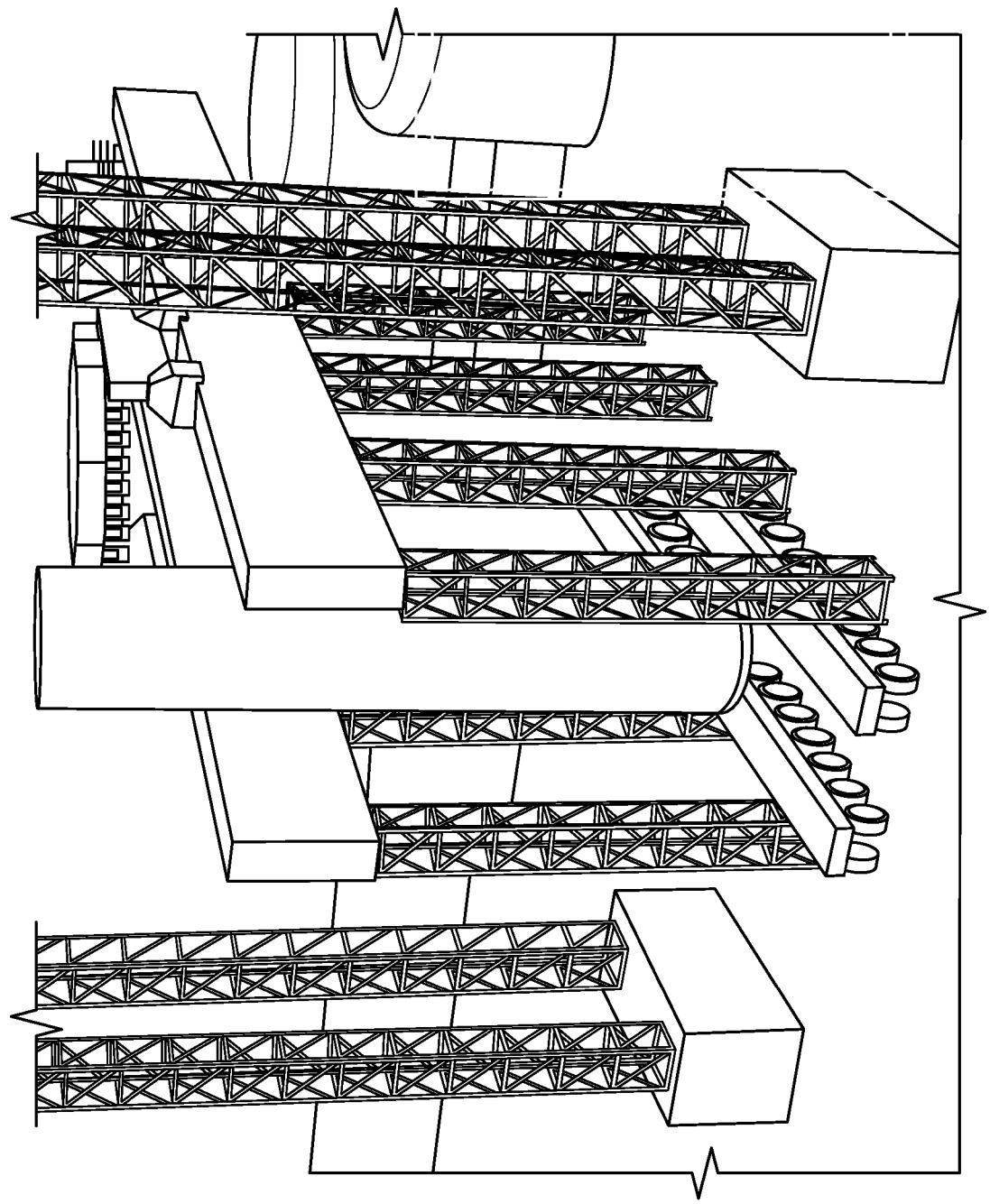

As shown in FIG. 4, in use, a first portion 130a of the wind turbine assembly, which is a lower tower section, on the vehicle 125, e.g. the transporter. The vehicle 125 is maneuvered towards the lifting frame 120 while carrying the first portion 130a of the wind turbine assembly, such that the first portion 130a of the wind turbine assembly is disposed below the lifting frame 120. Furthermore, as shown in FIG. 5, the first portion 130a is disposed between the rails 110a, 110b. The rails 110a, 110b extend below the lifting frame 120, and in particular below the gantry of the lifting frame 120.

Figure 6:
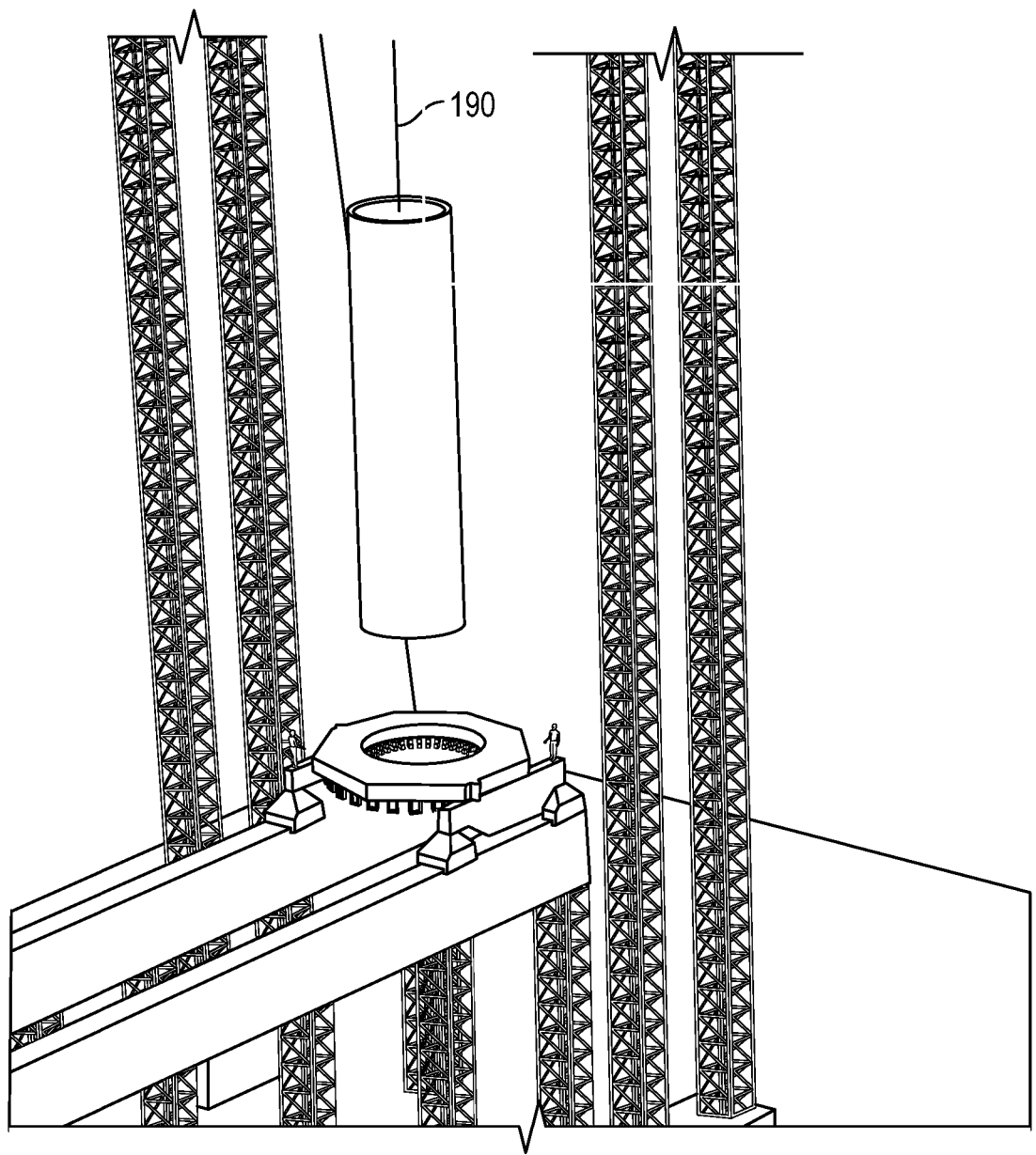

Next, the first portion 130a of the wind turbine assembly is attached to the lifting frame 120 by at least one line 190. Subsequently, the first portion 130a of the wind turbine assembly is hoisted in an upwards direction, until the first portion 130a is at a height above an upper level of the rails 1110a, 110b, as shown in FIG. 6.

In addition, disposing the clamp 105 is disposed in a in a first position, the first position being below the first portion 130a. That is, the clamp 105 is maneuvered along the rails 110a, 110b until the clamp in in a position below the first portion 130a.

Figure 7:
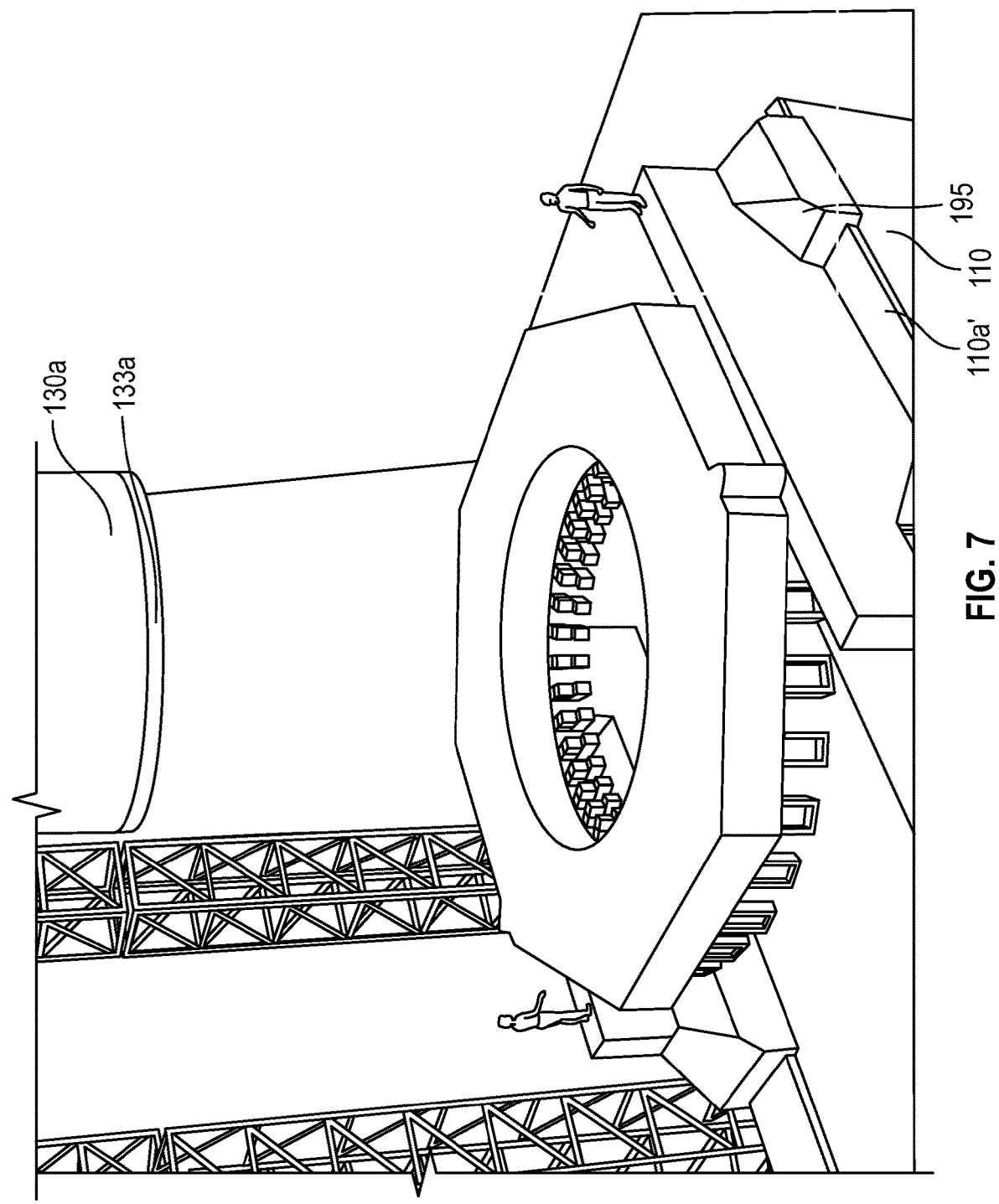
Figure 8:
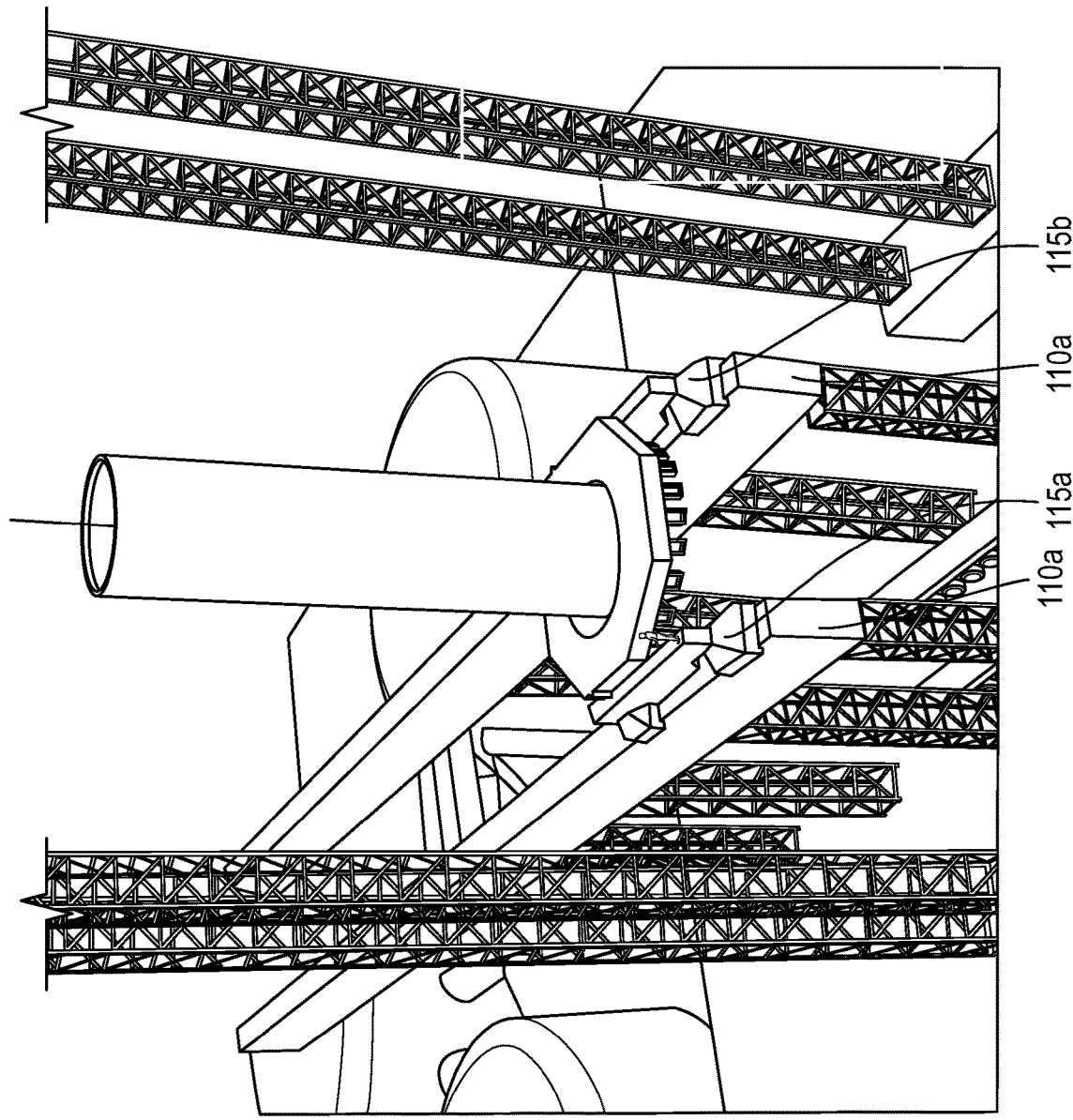

As shown by comparing FIGS. 7 and 8, the method of assembly comprises the step of lowering the first portion 130a into the clamp 105. The method also comprises configuring the clamp 105 into a clamping configuration, such that the clamp 105 grips the first portion 130a.

As can be seen more clearly from FIG. 8, in some embodiments the carriage 115 is formed from two distinct portions 115a, 115b, each portion 115a, 115b being disposed on a respective rail 110a, 110b. It will be appreciated that in other embodiments falling within the scope of the invention, the carriage 115 may be formed as a single device, or portions 115a, 115b maybe coupled or otherwise adjoined to one another.

The carriage 115 comprises a plurality of supports 195. In the disclosed embodiment there are four supports 195, although less than four supports 195 or more than four supports 195 may be implemented in alternative embodiments. In use, the supports 195 slide along a surface 110a' of a respective rail 110a.

The clamp 105 is configured to engage with a flange 133a disposed on an outer surface of the first portion 130a. The flange 133a is disposed at the bottom of the first section 130a.

Figure 9:
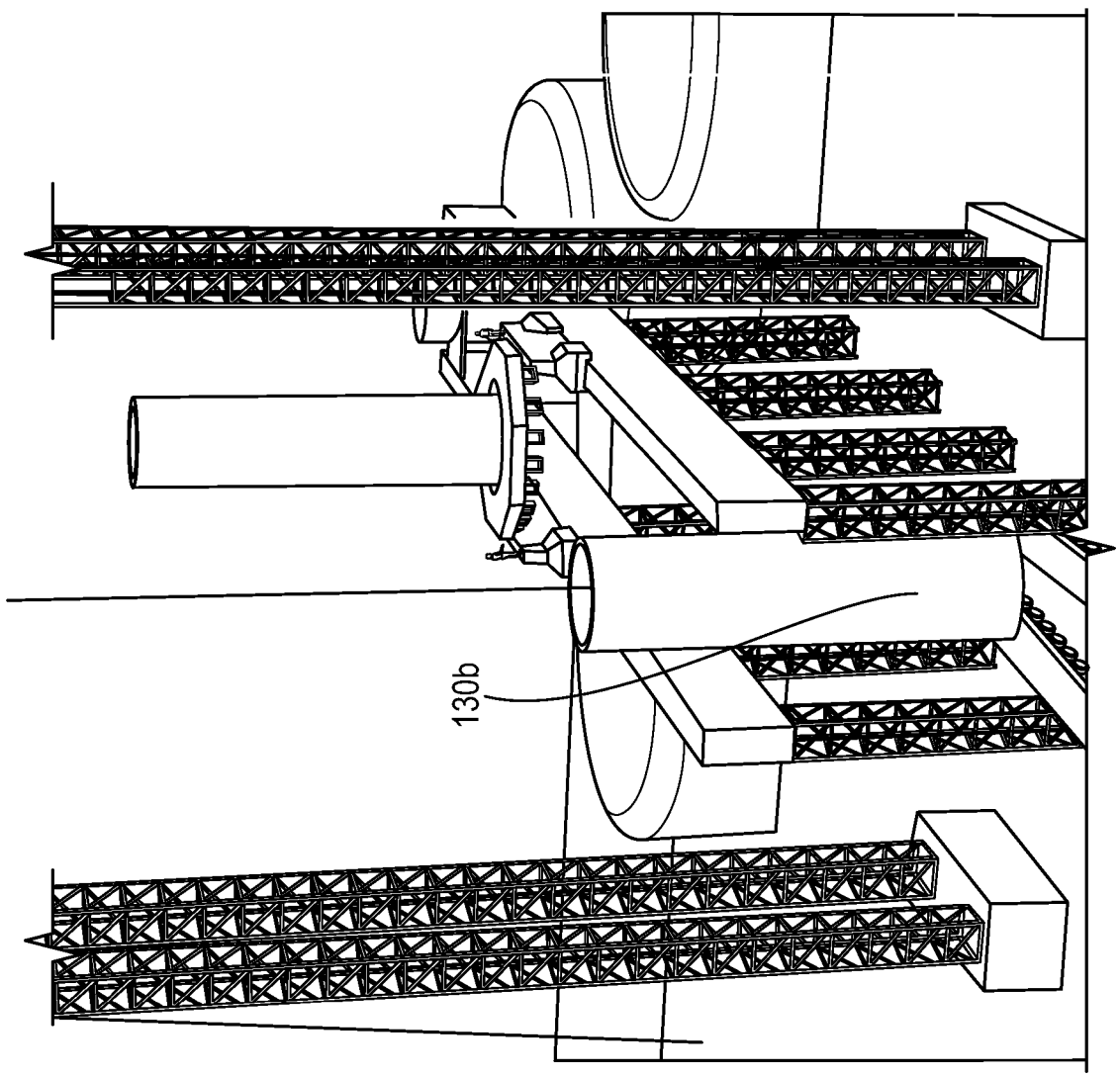

As shown in FIG. 9, in use the clamp 105 is moved from first position to a second position, the second position not being below the lifting frame 120. Subsequently, a second portion 130b of the wind turbine assembly, i.e. a mid-tower section of the wind turbine assembly, is positioned on the vehicle 125, e.g. the transporter.

In use, the vehicle 125 carried the second portion 130b of the wind turbine assembly towards the lifting frame 120. The second portion 130b is maneuvered to be disposed below the lifting frame 120 and between the rails 110a, 110b. The second portion 130b is then hoisted in an upwards direction to a height above an uppermost level of first portion 130a.

Figure 10:
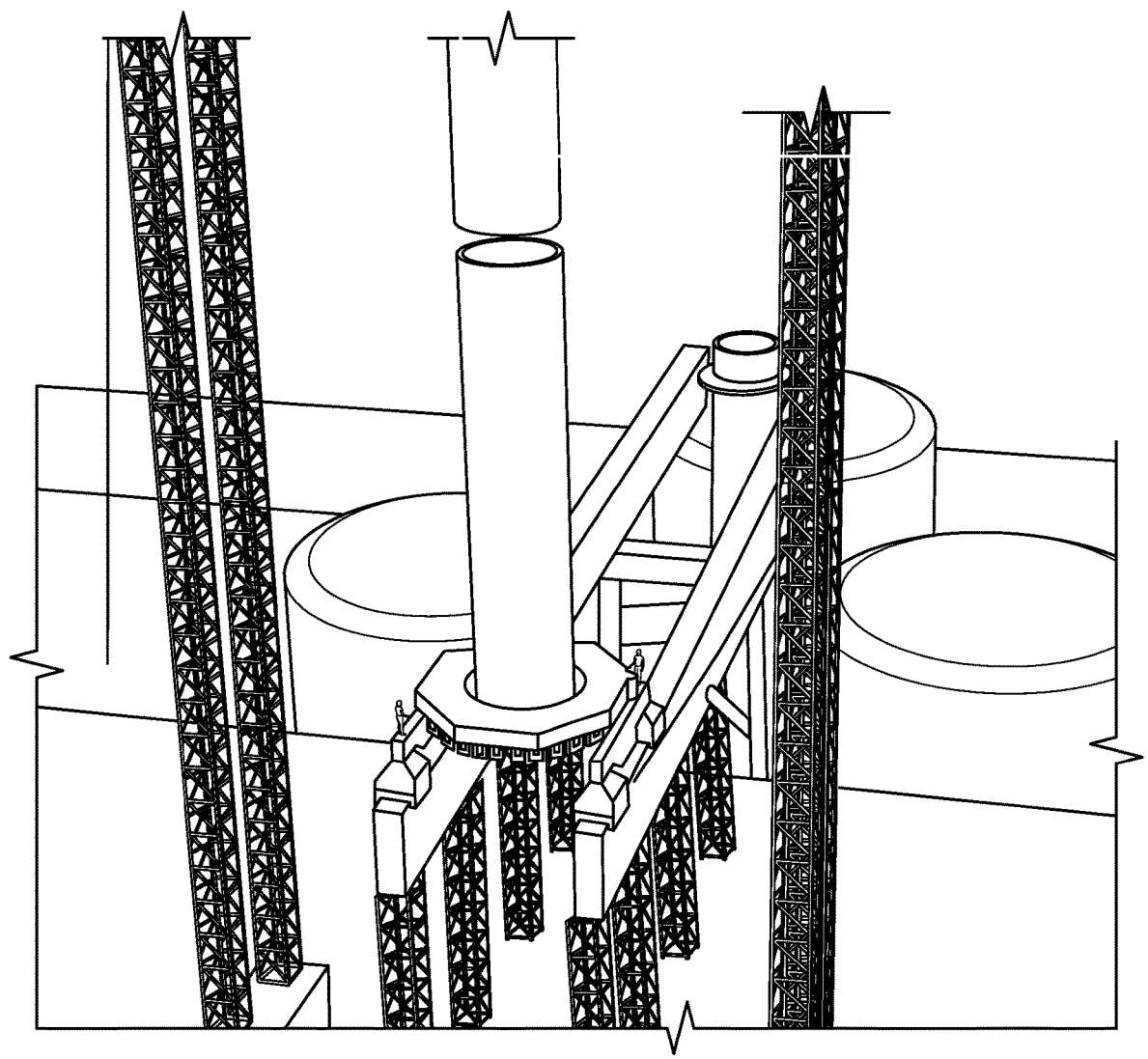

As shown in FIG. 10, the clamp 105 holding the first portion 130a I moved to the first position, wherein the first position is below the second portion 130b. Next, the second portion 130b is lowered onto the first portion 130a.

Figure 11:
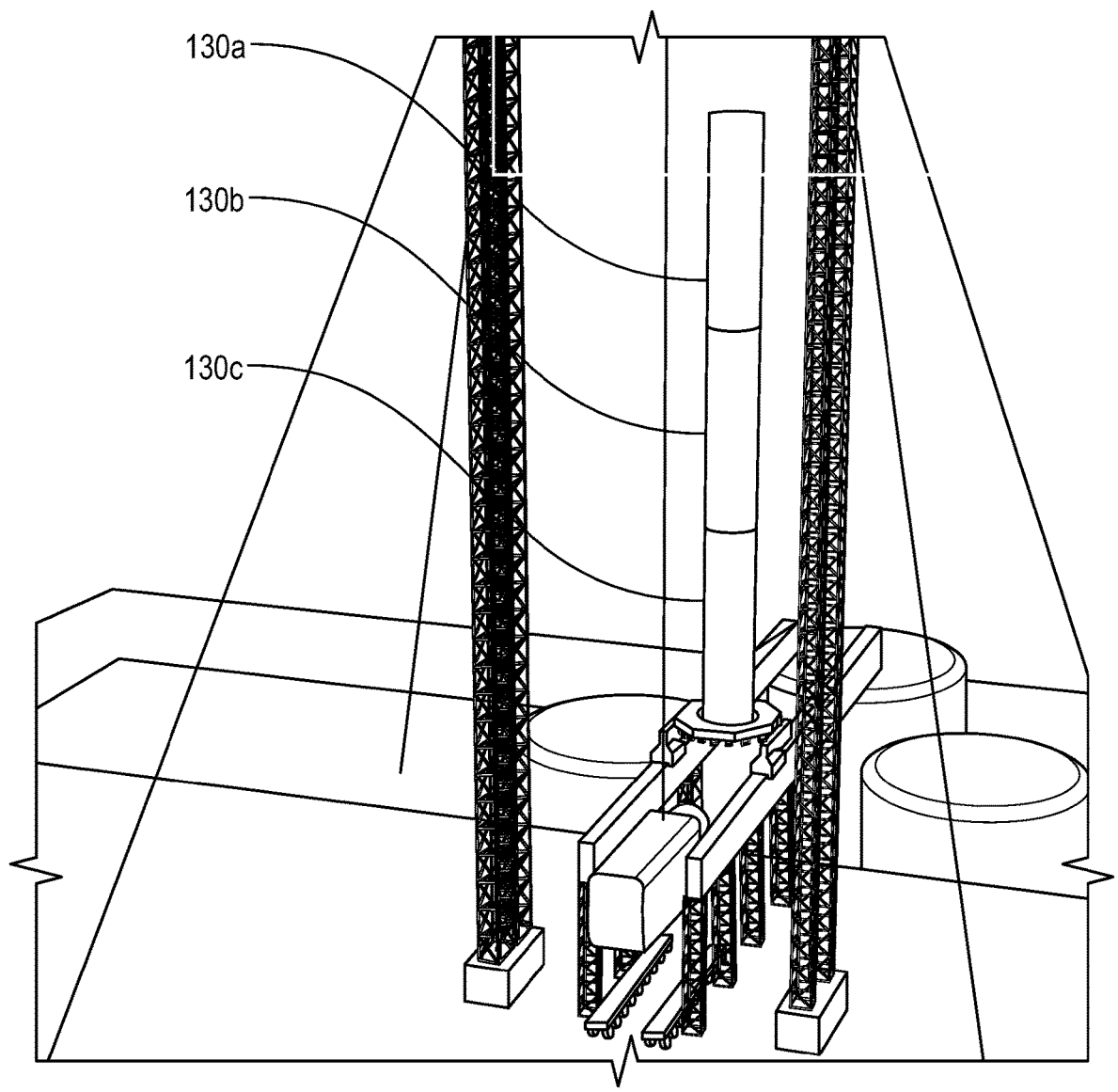
Figure 12:
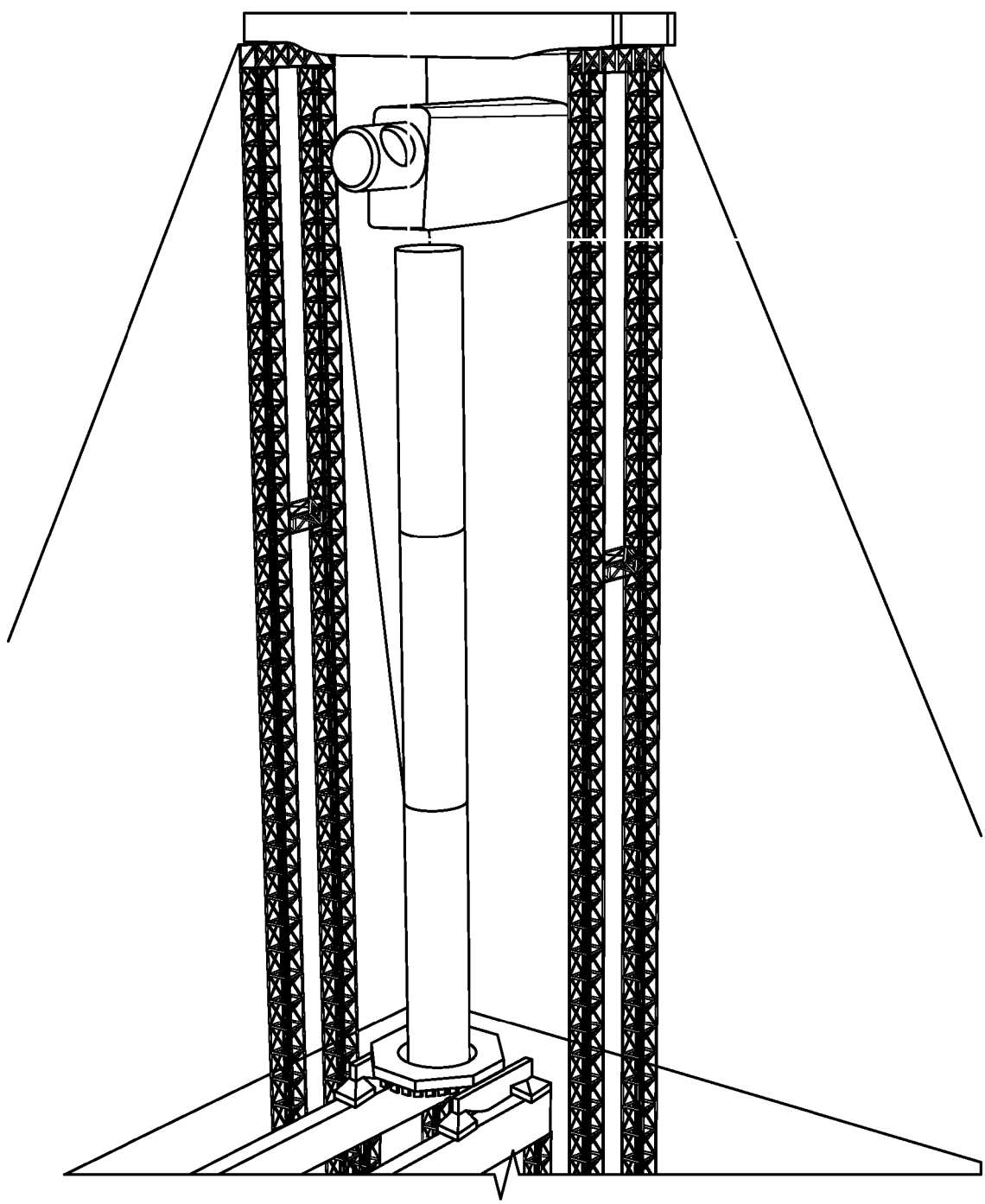
Figure 13:
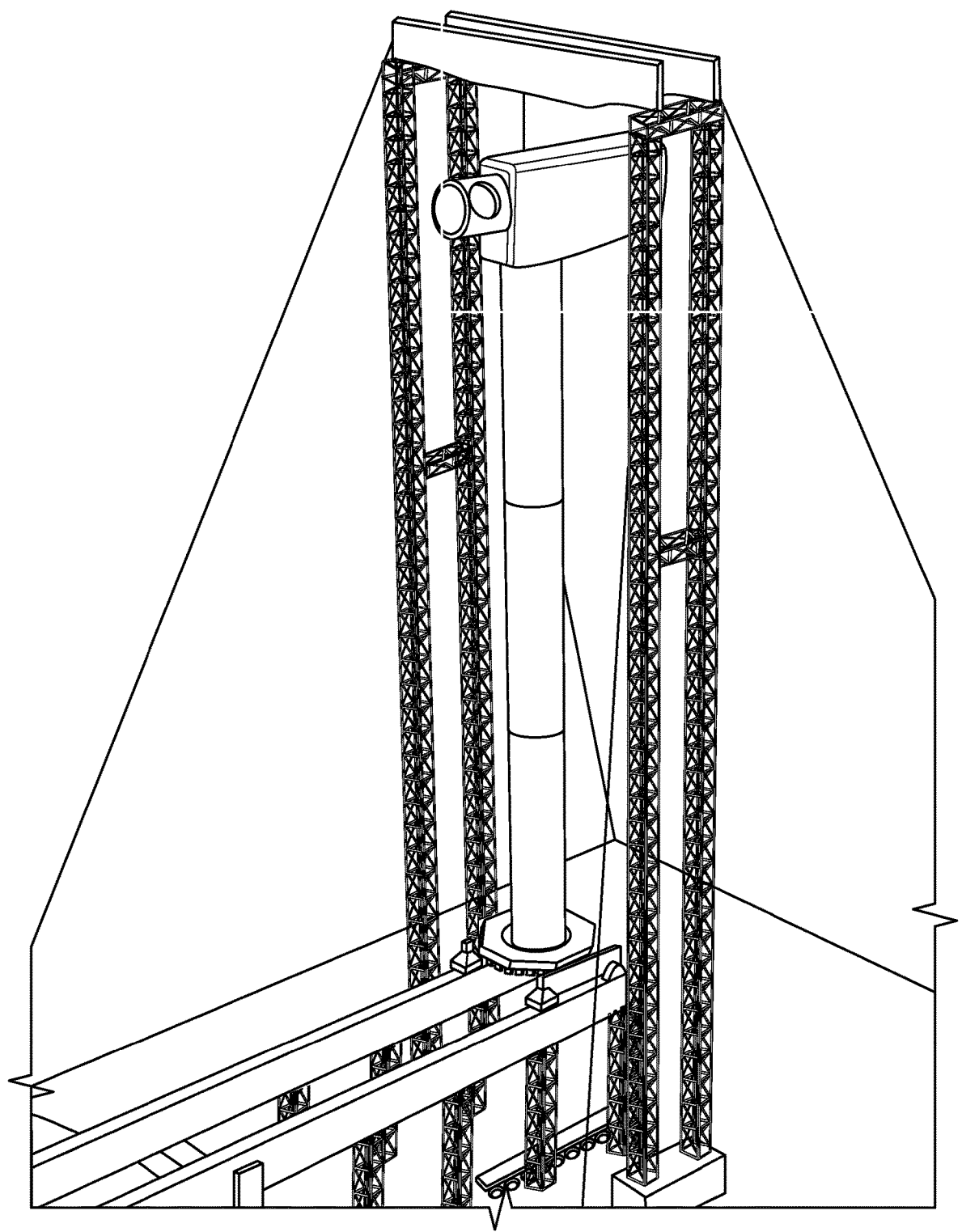
Figure 14:
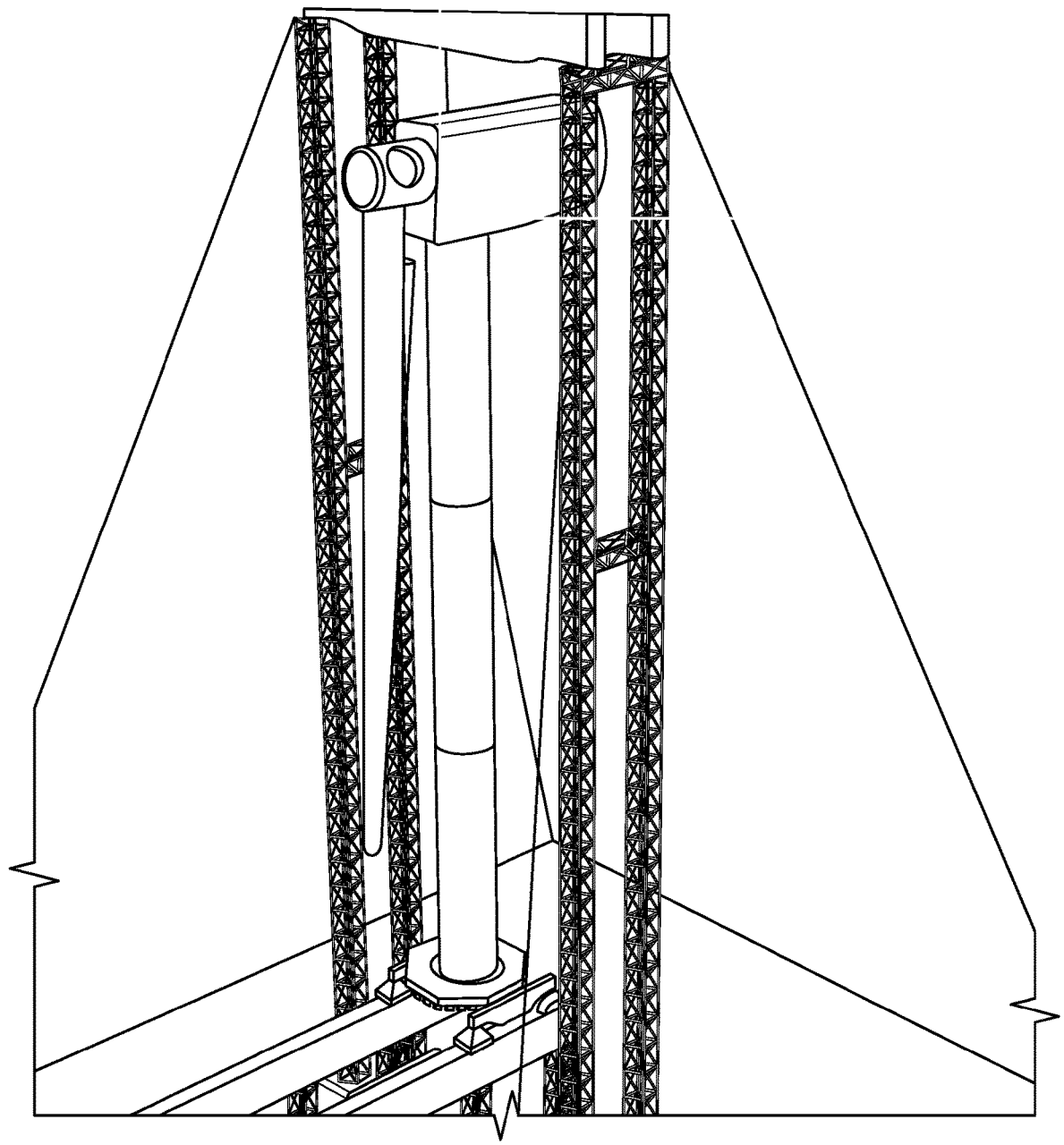
Figure 15:
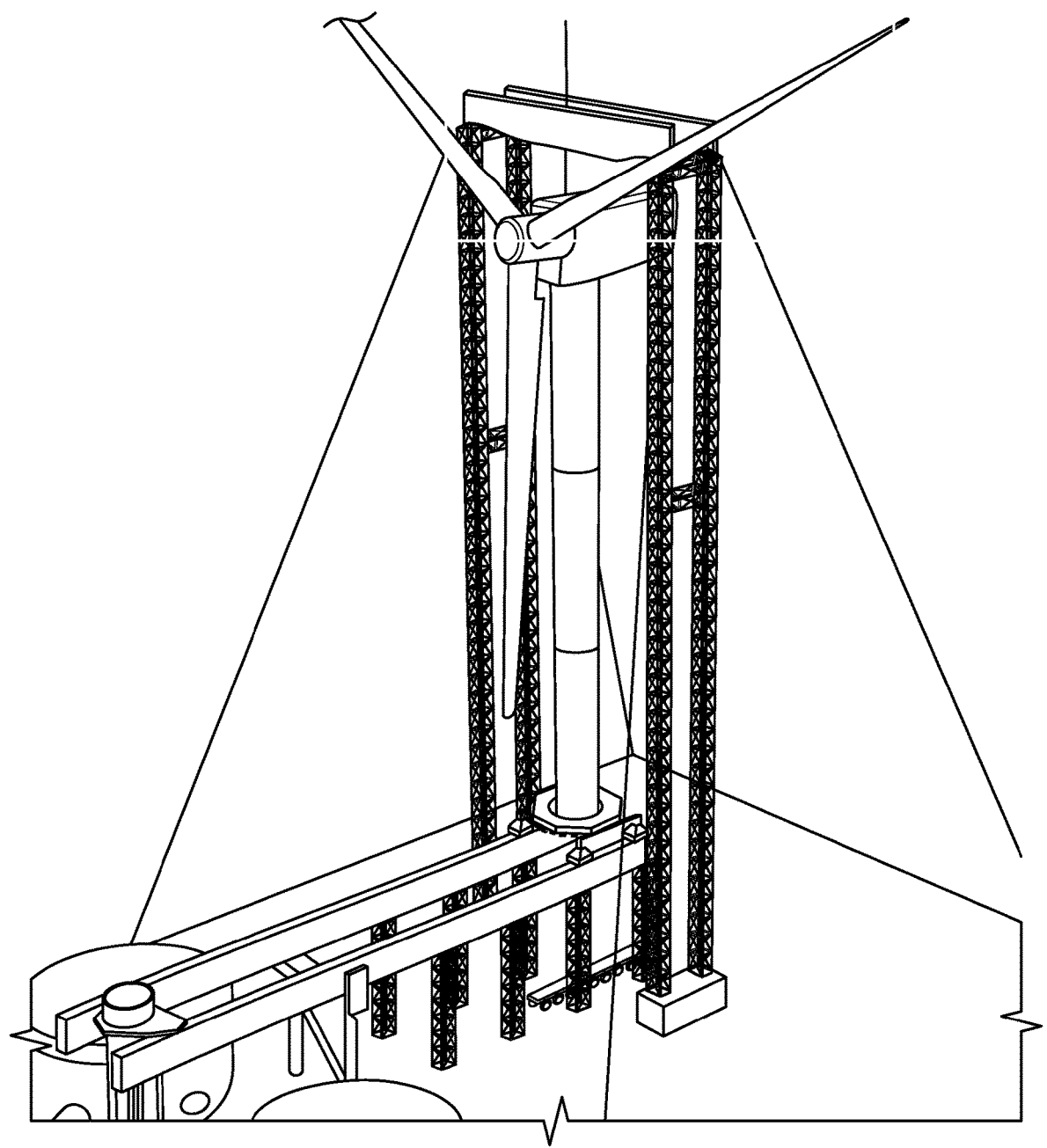

This process may be repeated to add further sections to the wind turbine assembly. For example, as shown in FIG. 11, the wind turbine assembly has been assembled to comprise a first portion 130a, a second portion 130b and a third portion 130c. Similarly, the steps may be repeated to add further components of the wind turbine assembly, such as the nacelle 140 and nose piece 145 as shown in FIGS. 12 and 13, and/or the blades 135 as shown in FIGS. 14 and 15.

It should be noted that because the blades are relatively light compared to the other wind turbine assembly sections or components, the blades 135 may be fitted by a separate shore-side crane.

Figure 16:
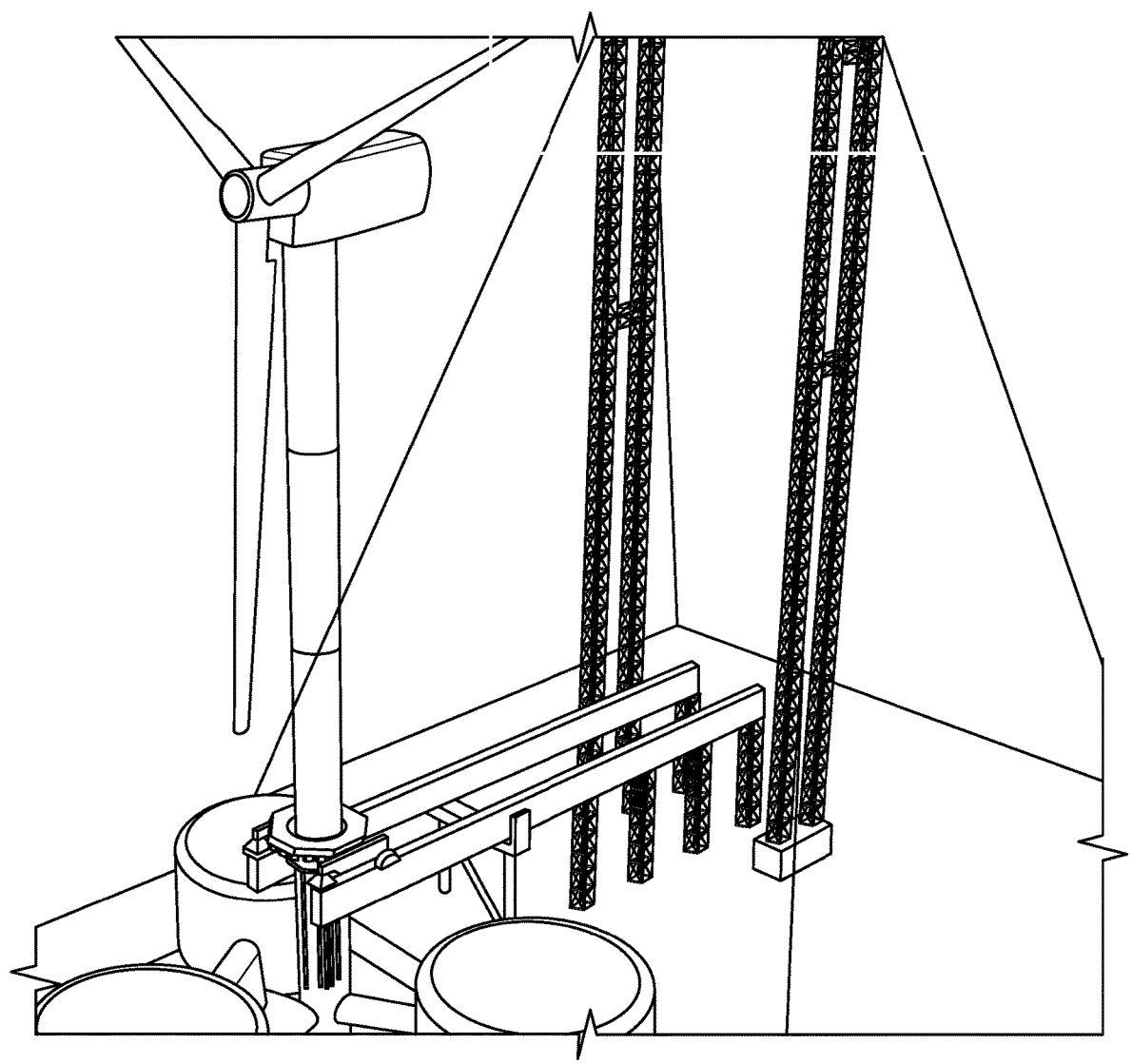
FIG. 16 a perspective view of an assembled wind turbine assembly mounted on a floating foundation, according to an embodiment of the present invention.
Figure 17:
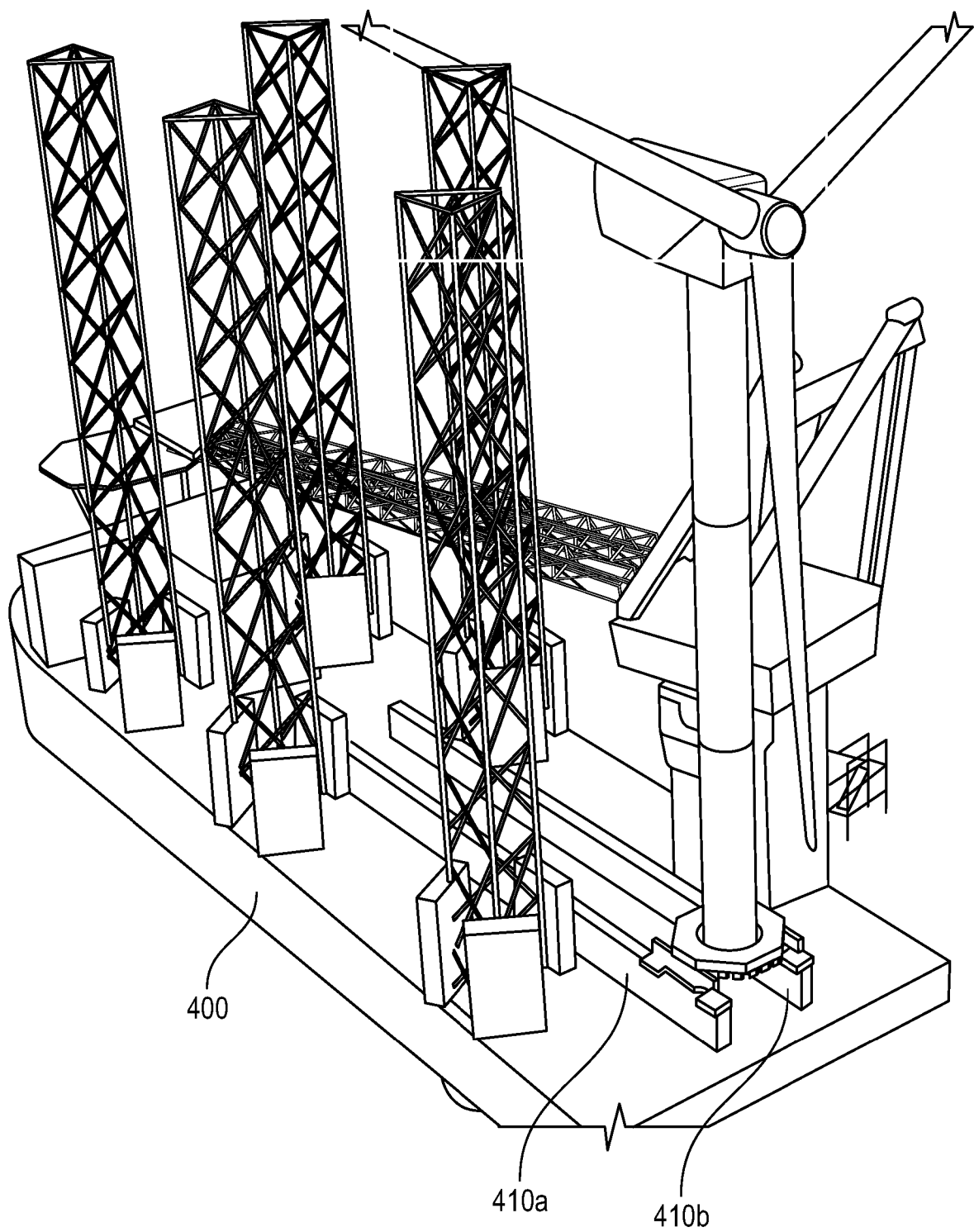
FIG. 17 a perspective view of an assembled wind turbine assembly mounted on a vessel, according to an embodiment of the present invention.

FIG. 16 shows a view of an assembled wind turbine assembly mounted on a floating foundation 150, according to an embodiment of the present invention. The assembled wind turbine assembly is moved along the rails 110a, 110b until it is disposed over the floating foundation 150. Alternatively, as shown in FIG. 17, the wind turbine assembly may instead be mounted on an installation vessel 400, wherein the installation vessel 400 is for carrying or transporting at least a portion of the wind turbine assembly.

The installation vessel 400 comprises rails 410a, 410b. In use, the rails 410a, 410b are aligned with the rails 110a, 110b such that the carriage 130 can maneuvered onto the vessel 400.

Herein described is a method of assembly Wind Turbine Generators (WTG) on a quayside. As turbines are getting bigger, >10 MW, they are not able to be transported by road. Therefore, a method of receiving the turbine parts alongside a quay, and then building them in a way that allows them to be slid/moved onto the installation vessel, or floating foundation is described herein.

The method uses rental rails, sliding carriages, transporter vehicles, and a tall gantry lifting frame. These parts are available on the rental market at less than half the cost of an equivalent rotating crane.

A desirable element of the assembly method is the Applicants turbine tower gripping clamp. The Applicant has a patent awarded for the gripping elements (GB 2479232 B), which utilises a flange at the bottom of the tower, which is designed to take the turbine and environmental loads of the turbine once deployed.

A shoulder or flange, which sticks or protrudes radially out from the tower outer diameter, provides the latching element which can be grabbed by a suitable clamp. The invention/method described here uses an assembly spread as shown in FIG. 1.

The above summary is intended to be merely exemplary and non-limiting. The invention includes one or more corresponding aspects, embodiments or features in isolation or in various combinations whether or not specifically stated (including claimed) in that combination or in isolation. It should be understood that the features defined above in accordance with any aspect of the present invention or below relating to any specific embodiment of the invention may be utilised, either alone or in combination with any other defined feature, in any other aspect or embodiment or to form a further aspect or embodiment of the invention.

While in this specification the term, "offshore", has been referred to, it will be understood that this term is not to be considered to be limited to at sea, but rather offshore can refer to any region or expanse of water, such as, seas, lochs, lakes, forths, estuaries, etc.

It will be appreciated from the foregoing that using a fixed gantry (which is inexpensive) in combination with a clamp and a rail is advantageous in that a part that is assembled can be moved out of a lifting area while a next part to be assembled is being maneuvered under a lift point and lifted. Once that part or component is lifted, then the already assembled part(s) can be relocated under the lifted component, and the lifted component is then lowered and assembled to the existing assembly. This requires a clamp, a trolley and a rail(s).

The assembly can be transferred onto a floating vessel or ship (which will most likely be of a jack-up type), and then transferred offshore, and transferred onto a fixed (rather than floating) foundation—again using a carriage and rail(s).

The Applicant discloses in isolation each individual feature described herein and any combination of two or more such features, to the extent that such features or combinations are capable of being carried out based on the specification as a whole in the light of the common general knowledge of a person skilled in the art, irrespective of whether such features or combinations of features solve any problems disclosed herein, and without limitation to the scope of the claims. The applicant indicates that aspects of the invention may consist of any such individual feature or combination of features. In view of the foregoing description it will be evident to a person skilled in the art that various modifications may be made within the scope of the invention.

It will be appreciated that the embodiments of the present invention hereinbefore described are given by way of example only and are not meant to limit the scope of thereof in any way.

The invention claimed is:

1. A method of assembling a wind turbine comprising the steps of:
 providing a lifting arrangement comprising:
  a gantry disposed over and/or directly above a rail or rails; and
  a lifting apparatus coupled to the gantry; and
 stacking portions of the structure by:
  conveyably disposing a first portion of the structure relative to the rail or rails by;
   lifting the first portion using the lifting apparatus;
   configuring a clamping device to grip the first portion; and
   conveying the clamping device along the rail or rails;
  lifting a second portion of the structure using the lifting apparatus;
  disposing the first portion underneath the second portion by further conveying the first portion gripped by the clamping device along the rail or rails; and
  lowering the second portion onto the first portion.

2. The method of claim 1, wherein the step of lifting the second portion using the lifting apparatus comprises hoisting and/or raising the second portion in an upwards direction to a height above an uppermost level of first portion.

3. The method of claim 1, comprising a step of fixedly coupling the second portion to the first portion by at least one of: bolting, welding, and/or clamping.

4. The method of claim 1, further comprising the step of stacking a further portion on the second portion by:
 lifting the further portion using the lifting apparatus;
 disposing the second portion of the structure underneath the further portion by conveying the second portion along the rail; and
 lowering the further portion onto the second portion.

5. The method of claim 4, wherein the first and/or second portion and/or further portion is at least one of a portion of a tower or a nacelle.

6. The method of claim 1, wherein the gantry is disposed over a pair of parallel rails, the method comprising the preceding step of disposing the second portion between the rails.

7. The method of claim 1, wherein the rail/rails is/are configured to extend or be continued onto a floating structure, and further comprising the step of conveying the first and second portions along the rail onto the floating structure.

8. The method of claim 1, wherein the gripping and/or clamping device is configured for supporting and/or clamping and/or gripping at least a portion of the structure in a vertical disposition and/or substantially upright configuration.

* * * * *